(12) United States Patent
Holmqvist et al.

(10) Patent No.: US 12,355,304 B2
(45) Date of Patent: Jul. 8, 2025

(54) BRUSHLESS DIRECT CURRENT ELECTRIC MOTOR AND HANDHELD TOOL

(71) Applicant: Mirka Ltd, Jepua (FI)

(72) Inventors: Tobias Holmqvist, Korsholm (FI); Simon Bäck, Vörå (FI); Tomas Södergård, Nykarleby (FI)

(73) Assignee: Mirka Ltd, Jepua (FI)

( * ) Notice: Subject to any disclaimer, the term of this patent is extended or adjusted under 35 U.S.C. 154(b) by 225 days.

(21) Appl. No.: 18/266,002

(22) PCT Filed: Dec. 8, 2021

(86) PCT No.: PCT/FI2021/050854
§ 371 (c)(1),
(2) Date: Jun. 8, 2023

(87) PCT Pub. No.: WO2022/129685
PCT Pub. Date: Jun. 23, 2022

(65) Prior Publication Data
US 2024/0039348 A1    Feb. 1, 2024

(30) Foreign Application Priority Data
Dec. 14, 2020   (FI) .................................. 20206297

(51) Int. Cl.
| | | |
|---|---|---|
| *H02K 1/20* | (2006.01) | |
| *B25F 5/00* | (2006.01) | |
| *H02K 1/18* | (2006.01) | |
| *H02K 7/08* | (2006.01) | |
| *H02K 7/14* | (2006.01) | |
| *H02K 9/19* | (2006.01) | |

(Continued)

(52) U.S. Cl.
CPC .............. *H02K 1/20* (2013.01); *B25F 5/008* (2013.01); *H02K 1/187* (2013.01); *H02K 7/085* (2013.01); *H02K 7/145* (2013.01); *H02K 9/19* (2013.01); *H02K 9/227* (2021.01); *H02K 21/22* (2013.01)

(58) Field of Classification Search
CPC .......... B25F 5/008; H02K 1/187; H02K 1/20; H02K 7/085; H02K 7/145; H02K 9/19; H02K 9/227; H02K 21/22
USPC ........................................................... 310/50
See application file for complete search history.

(56) References Cited

U.S. PATENT DOCUMENTS 4,128,364 A   12/1978 Papst et al.
5,708,539 A    1/1998 Schuh
(Continued)

FOREIGN PATENT DOCUMENTS

| CN | 101814797 A | 8/2010 |
| CN | 105762985 B | 6/2018 |
| EP | 3157139 A1 | 4/2017 |

OTHER PUBLICATIONS

International Search Report and Written Opinion in PCT/FI2021/050854, mailed Mar. 30, 2022, 17 pages.

*Primary Examiner* — Rashad H Johnson
(74) *Attorney, Agent, or Firm* — ArentFox Schiff LLP (57) ABSTRACT

There is provided be a brushless direct current, BLDC, electric motor. The BLDC electric motor comprises a rotor comprising a rotor shaft and a stator arranged around the rotor shaft. The stator comprises a stator hub comprising electromagnets, and cooling channels extending in a direction that is parallel to a longitudinal direction of the rotor shaft and the cooling channels are positioned between the rotor shaft and the electromagnets.

17 Claims, 8 Drawing Sheets

(51) Int. Cl.
  *H02K 9/22* (2006.01)
  *H02K 21/22* (2006.01)

(56) References Cited

U.S. PATENT DOCUMENTS

| | | | |
|---|---|---|---|
| 12,255,520 B2 * | 3/2025 | Walbaum | H02K 1/32 |
| 2002/0145348 A1 | 10/2002 | Anma | |
| 2011/0031803 A1 | 2/2011 | Park et al. | |
| 2020/0001447 A1 | 1/2020 | Yang | |
| 2020/0177056 A1 | 6/2020 | Nakamura et al. | |
| 2022/0163052 A1 * | 5/2022 | Deeg | F04D 19/002 |
| 2022/0239197 A1 * | 7/2022 | Yatsurugi | H02K 1/276 |
| 2022/0345001 A1 * | 10/2022 | Sundberg | H02K 5/20 |
| 2022/0363092 A1 * | 11/2022 | Copeland | B60B 19/00 |
| 2023/0043968 A1 * | 2/2023 | Häfner | H02K 5/207 |
| 2023/0402896 A1 * | 12/2023 | Blanchard St-Jacques | H02K 3/50 |
| 2024/0014710 A1 * | 1/2024 | Rustichelli | H02K 7/003 |
| 2024/0055948 A1 * | 2/2024 | Shanmukha | F01D 15/10 |
| 2024/0113583 A1 * | 4/2024 | Tanaka | B64D 33/08 |
| 2024/0200558 A1 * | 6/2024 | Lu | F04C 29/04 |
| 2024/0313621 A1 * | 9/2024 | Gloede | H02K 9/19 |
| 2024/0333106 A1 * | 10/2024 | Ito | H02K 9/19 |
| 2024/0364152 A1 * | 10/2024 | Sever | H02K 3/345 |
| 2024/0405640 A1 * | 12/2024 | Warren | H02K 9/19 |
| 2025/0015656 A1 * | 1/2025 | Markow | H02K 7/003 |
| 2025/0023412 A1 * | 1/2025 | Holst | H02K 1/32 |
| 2025/0088054 A1 * | 3/2025 | Yao | H02K 1/32 |
| 2025/0096645 A1 * | 3/2025 | Greiter | H02K 9/26 |

* cited by examiner

BRUSHLESS DIRECT CURRENT ELECTRIC MOTOR AND HANDHELD TOOL

CROSS-REFERENCE TO RELATED APPLICATIONS

This application is a National Phase of PCT Application No. PCT/FI2021/050854, filed on Dec. 8, 2021, which claims priority to Finnish Application No. 20206297, filed on Dec. 14, 2020, the disclosures of which are hereby incorporated by reference in their entireties.

TECHNICAL FIELD

The present invention relates to a brushless direct current, BLDC, electric motor and particularly to cooling of a BLDC electric motor.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Electric motors can be exposed to dust and heat build-up. The build-up of heat can be caused by resistive heating, iron losses and friction. Excessive heating of an electric motor can lead to degradation of the electric motor and eventually to a failure. Cooling air can contaminate the electric motor with particles. The particles can accumulate to the electric motor over time, whereby the cooling becomes less effective.

SUMMARY

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Identical or corresponding functional and structural elements which appear in the different drawings are assigned the same reference numerals. When the words first and second are used to refer to different elements, it is to be understood that this does not necessarily imply or mean that the first and second elements are somehow structurally substantially different elements or that their dimensions are substantially different unless specifically stated.

Figure 1:
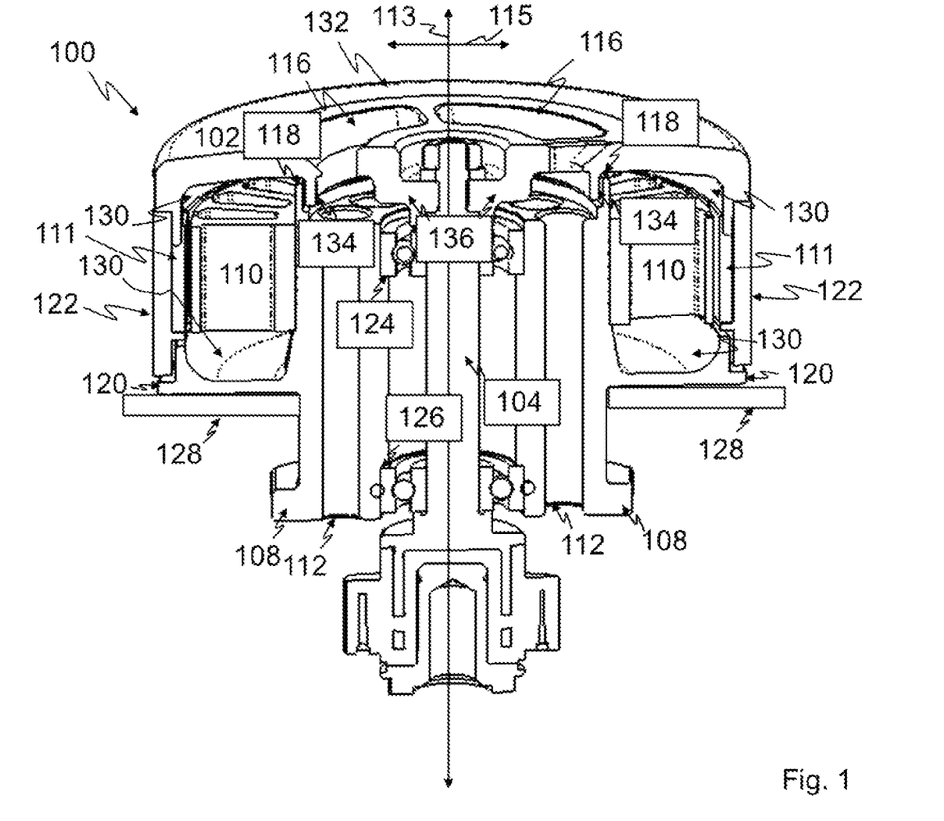
FIG. 1 illustrates an example of an electric motor in accordance with at least some embodiments.
Figure 2:
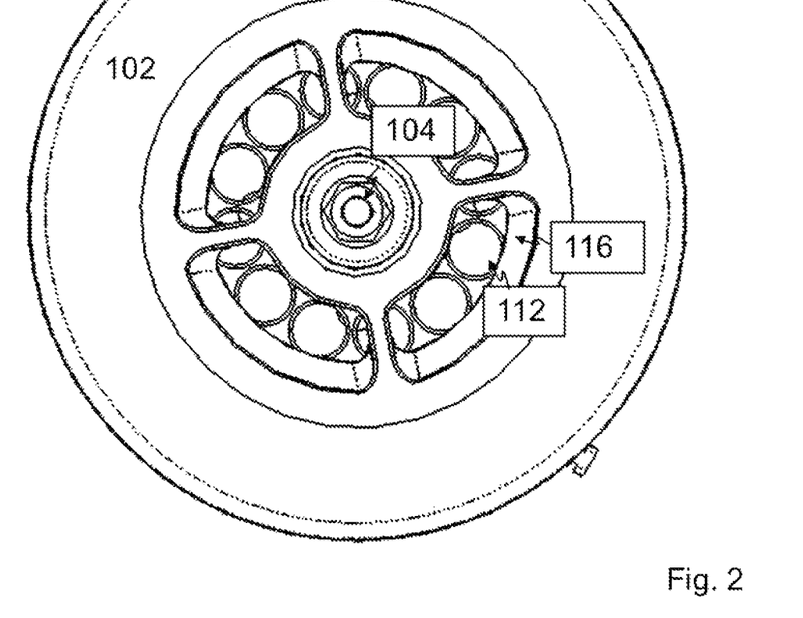
FIG. 2 illustrates is a top view of the electric motor.
Figure 3:
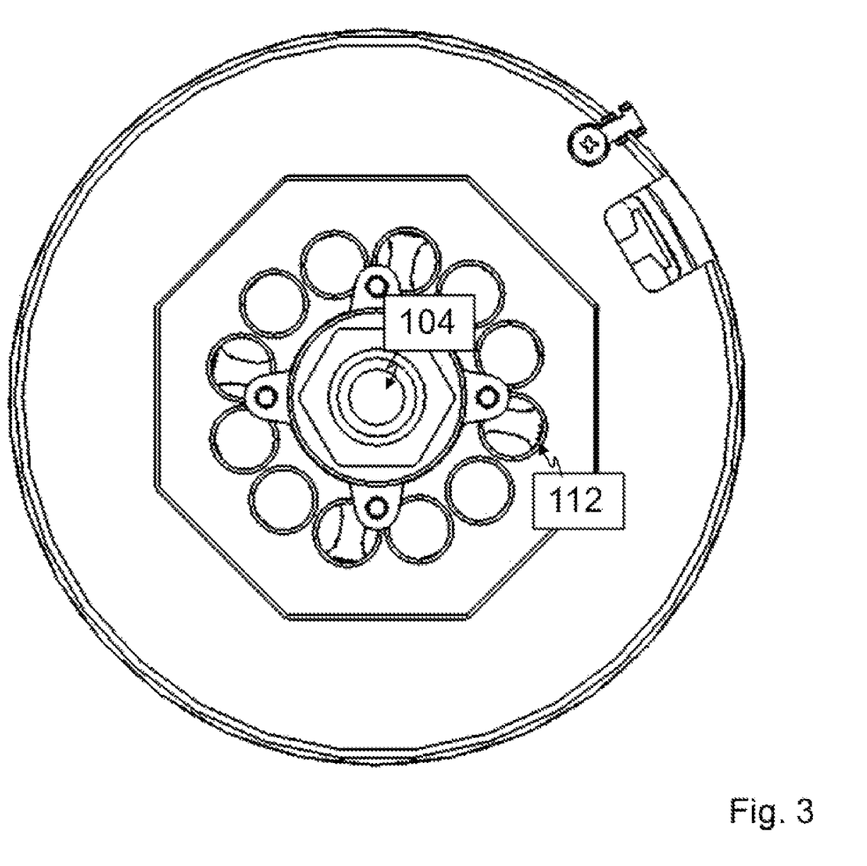
FIG. 3 illustrates is a bottom view of the electric motor.

FIG. 1 illustrates an example of an electric motor in accordance with at least some embodiments. In FIG. 1, the electric motor is illustrated by a cross-section of the electric motor in a longitudinal direction 113 of a rotor shaft 104 of the electric motor. FIG. 2 illustrates a top view of the electric motor and FIG. 3 illustrates is a bottom view of the electric motor. The electric motor may be a brushless direct current, BLDC, electric motor 100. It should be noted that a brushless direct current, BLOC, electric motor may alternatively or additionally be referred to an electronically commutated motor (ECM or EC motor) or a synchronous DC motor. On the other hand, the BLDC electric motor 100, may be referred to an outrunner motor on the basis of the physical construction of the BLDC electric motor. FIG. 1, FIG. 2 and FIG. 3 illustrate an outrunner motor that comprises a stator comprising electromagnets 110 which are arranged annular to the rotor shaft 104 and form a center (core) of the motor.

The electromagnets 110 of the outrunner motor are surrounded by an overhanging rotor that comprises permanent magnets 111. The overhanging rotor may comprise an outer shell 102 connected to the rotor shaft 104. In the outrunner motor, the outer shell is caused to rotate by selectively switching DC to the electromagnets, which causes a rotation of the rotor shaft. The permanent magnets 111 may be arranged annularly with respect to the electromagnets, e.g. on the inner surface of the outer shell.

An example of the stator is a stator assembly, comprising a body or a stator hub 108 that is arranged annular to the rotor shaft 104. The rotor shaft 104 may extend through the stator hub and connected rotatably, e.g. by one or more bearing assemblies, to the stator hub. In accordance with at least some examples, the stator hub may comprise cooling channels 112 for cooling down the BLDC electric motor 100.

The BLDC electric motor 100 comprises cooling channels 112 that extend through the stator in the longitudinal direction 113 of the rotor shaft 104. The cooling channels comprise openings at ends that are separated from each other at least in the longitudinal direction 113 of the rotor shaft. The cooling channels provide that a fluid, i.e. a coolant fluid, for example a liquid, a gas, a mixture of gases such as air, may flow through the cooling channels via the openings of the cooling channels for cooling down the BLDC electric motor. In this way, particularly those parts of the BLOC electric motor that are operatively connected to the cooling channels for transferring heat into the coolant fluid flowing inside the cooling channels may be cooled by the coolant fluid. Examples of liquids for cooling the BLDC comprise at least water. It should be noted that for certain coolant fluids, e.g. water, sealings may be adapted and added to the BLDC electric motor for controlling flow of the coolant as needed and to avoid the coolant damaging the BLOC electric motor. In an example the heat transfer may be provided by a material of the parts of the BLDC electric motor that are in contact with the cooling channels. Since the cooling channels extend through the stator, at least the material of the stator hub, where the cooling channels 112 are located, should support efficient heat transfer from the BLDC electric motor to the coolant fluid inside the cooling channels. An example of a material that provides efficient heat transfer is Aluminum (Al).

The cooling channels 112 may be arranged annularly with respect to the rotor shaft 104, between the rotor shaft and the electromagnets 110, whereby the electromagnets arranged around the cooling channels in a radial direction 115 of the rotor may be cooled down by the coolant fluid flowing through the cooling channels. Accordingly, the cooling channels may extend between the rotor shaft and the electromagnets 110. In an example, the cooling channels 112 may be arranged around the rotor shaft 104 at even distances, whereby an even heat transfer from the BLDC electric motor to the coolant fluid inside the cooling channels may be supported.

The cooling channels 112 provide longitudinal passages between openings of the cooling channels. The passages may have cross-sections that may be of various forms that support cooling of the parts of the BLDC electric motor, e.g. electromagnets, by a flow of coolant fluid via the cooling channels. Examples of the cross-sections comprise at least circular cross-sections, rectangular cross-sections and/or arched cross-sections. It should be noted that the cooling channels may also have other shapes depending on the structure of the BLOC electric motor and implementation requirements for cooling the BLDC electric motor.

The BLDC electric motor may comprise a fan arranged at one end of the cooling channels 112 for controlling a direction of fluid flow via the cooling channels. The fan is configured to be rotated by the rotor shaft 104 for producing a pressure difference over the fan in the longitudinal direction 113 of the rotor shaft, and hence force, the fluid flow through the fan and into the cooling channels or out of the cooling channels. The outer shell 102 may serve as the fan or the BLDC electric motor comprises a separate fan connected to the rotor shaft 104. In an example, the fan may be positioned at a side of the BLDC electric motor, where the stator hub is uncovered and/or the electromagnets are uncovered. The side of the BLDC electric motor, where the stator hub is uncovered and/or the electromagnets are uncovered may be a side, where the outer shell 102 is not covering the stator hub and/or the electromagnets 110. The stator hub may be uncovered for example at least at one side of opposite sides, e.g. at a top side and at a bottom side, in the longitudinal direction 113 of the rotor shaft. In the illustrated example, the outer shell 102 is shown covering a top side of the electromagnets 110 and the stator hub 108, whereby the fan may be arranged to an opposite side of the stator hub in the longitudinal direction 113 of the rotor shaft, e.g. at a bottom side, of the BLDC electric motor. When positioned at the bottom side of the stator hub, rotation of the fan may cause a negative pressure inside the cooling channels 112. This causes coolant fluid to be drawn into the cooling channels through the openings of the cooling channels at the top side of the BLDC electric motor and out of the cooling channels via openings of the cooling channels at the bottom side the BLDC electric motor.

The electromagnets 110 may be enclosed in a sealed space 130 for preventing contamination of the electromagnets 110 by particles carried by the fluid flow. The sealed space may be formed by the stator hub, the outer shell 102 and sealing structures 118,120 between the stator hub and the outer shell. The cooling channels 112 run outside of the sealed space between the sealed space and the rotor shaft 104, whereby the electromagnets 110 are protected against particles such as dust and/or debris carried by the coolant fluid.

The sealing structures 118,120 may be configured to support a rotational movement of the stator and the outer shell 102 with respect to each other. The sealing structures may be configured to support the rotational movement of the stator and the outer shell with respect to each other at least, when a mechanical friction caused by the sealing structures to the rotational movement between the stator and the outer shell is small and/or the sealing structures do not cause mechanical friction to the rotational movement between the stator and the outer shell. Examples of sealing structures that may provide a small or a very small friction may comprise shaft sealings and bearing assemblies. Examples of sealing structures that may provide frictionless sealing comprise non-contact sealings such as labyrinth sealings. The sealed space 130 may comprise more than one type of sealing structures. For example, one of the sealing structures 118 may be a shaft sealing or a bearing assembly, and another one of the sealing structures may be a non-contact sealing such as a labyrinth sealing.

The outer shell 102 may comprise a surface 132, e.g. a top surface, that is connected to the rotor shaft 104 and configured to extend at least in the radial direction 115 of the rotor on one side of the electromagnets 110. In this way the outer shell 102 may serve for covering the electromagnets 110 on the one side, e.g. the top side. The outer shell may also comprise an annular part 122 that is arranged to extend in a direction that is parallel to a longitudinal direction of the rotor shaft. Accordingly, it should be noted that the annular part may form a part of the outer shell 102. The annular part may cover a side of the electromagnets 110 and the stator hub 108 that extends parallel to the longitudinal direction 113 of the rotor shaft. The permanent magnets 111 may be attached to the annular part at positions, where the permanent magnets surround the electromagnets. For attaching to the permanent magnets, the annular part may comprise ferromagnetic material, e.g. iron. Positioning the permanent magnets at the annular part provides that, when the electromagnets 110 are selectively activated by the DC, rotation of the outer shell may be caused at a desired speed and torque. It should be noted that in some examples, the annular part 122 of the outer shell may comprise one or more through-openings.

The outer shell 102 may be configured to provide one or more passages for the flow of the coolant fluid from outside of the BLDC electric motor into the cooling channels 112 or vice versa. For this purpose, the outer shell may be provided with one or more through-openings 116 that allow the coolant fluid to flow through the outer shell in the direction 113 of length of the rotor shaft and/or in a direction that is parallel to a radial direction 115 of the rotor. In an example, a through-opening may comprise orifices on opposite sides of the outer shell and connected by a passage through the outer shell. In an example, the through-openings may be provided on a surface, e.g. the top surface 132, of the outer shell that extends in a direction that is parallel to a radial direction 115 of the rotor and covers the electromagnets from one side, e.g. from the top or from the bottom. In another example, the through-openings may be provided on a surface, e.g. surface of the annular part 122, of the outer shell 102 that is arranged to extend in a direction that is parallel to a longitudinal direction 113 of the rotor shaft and covers the electromagnets on one or more sides that may be arranged for example annular to the rotor shaft. The through-openings may be rectangular openings, circular openings and/or openings that are arched with respect to the rotor shaft. The outer shell may be at least partly of material, e.g. Al, that provides efficient heat transfer, whereby the outer shell may serve for cooling of the electromagnets.

The one or more through-openings 116 of the outer shell 102 may be shaped for causing a fluid flow through the cooling channels 112, whereby the outer shell 102 may serve as a fan. In this way the outer shell may produce a pressure difference over the fan in the longitudinal direction 113 of the rotor shaft, and hence force, the fluid flow through the fan and into the cooling channels or out of the cooling channels. In this way, the fluid flow through the cooling channels may be supported even without a separate fan connected to the rotor shaft 104.

In an example, the one or more through-openings 116 may provide inlets for the coolant fluid on a top surface 132 of the outer shell 102. On an opposite side, e.g. a bottom side, of the top surface of the outer shell 102, a passage may be provided for guiding the coolant fluid into the cooling channels 112. The passage may be formed by annular structures 134, 136 of the outer shell 102. The annular structures may extend between the through-openings and the stator hub 108, and between the through-openings the rotor shaft 104. One of the annular structures 134 may form one or more outer edges of the through openings and one of the annular structures 136 may form one or more inner edges of the through openings. The outer and inner edges may be defined based on the radial direction 115 of the rotor. The annular structure 136 forming the one or more inner edges may extend between the through-openings and the rotor shaft 104, and the annular structure 134 forming the one or more outer edges may extend between the through-openings and the stator hub. Accordingly, the annular structures 136,134 may be annular to the rotor shaft and the annular structure 136 forming the one or more inner edges may be closer to the rotor shaft in the radial direction 115 than the annular structure 134 forming the one or more outer edges. In this way the cooling channels may be positioned between the annular structures 134, 136 in the radial direction of the rotor. A sealing structure may connect the annular structure 134 to the stator hub. A connection between the annular structure 136 and the rotor shaft may be an interference fit.

The stator hub 108 may comprise mounting positions 124,126 for bearing assemblies. The bearing assemblies mounted to the mounting positions connect the rotor shaft 104 rotatably with respect to the stator. In this way, the rotor shaft 104 may be rotated at a desired torque and speed with respect to the stator, when the electromagnets 110 are selectively activated by DC.

The mounting positions 124,126 for bearing assemblies may be separated in the longitudinal direction of the rotor shaft 104, for example the mounting positions may be arranged at the stator hub to positions that are separated in the longitudinal direction of the rotor shaft on the basis of a length of the cooling channels 112. Accordingly, the mounting positions may be separated by substantially, e.g. at most, by the length of the cooling channels, whereby the cooling channels may extend between the mounting positions for cooling both the bearing assemblies at the mounting positions and the electromagnets.

In accordance with at least some embodiments, the BLDC electric motor comprises a rotor 102 comprising a rotor shaft 104 and a stator arranged around the rotor shaft. The stator comprises a stator hub 108 comprising electromagnets 110, and cooling channels 112 extending in a direction that is parallel to a longitudinal direction 113 of the rotor shaft and the cooling channels 112 are positioned between the rotor shaft 104 and the electromagnets 110. The positioning of the cooling channels provides that the stator may be cooled by a coolant fluid flowing through the cooling channels.

In accordance with at least some embodiments, the rotor, comprises an outer shell 102 connected to the rotor shaft 104 and the outer shell is configured to extend in a direction that is parallel to a radial direction 115 of the rotor on one side of the electromagnets 110 for covering the electromagnets 110. The outer shell comprises one or more through-openings 116 for passage of fluid between surroundings of the BLDC electric motor and the cooling channels 112. In this way the outer shell allows a coolant fluid to pass through the outer shell, while also covering the electromagnets and the permanent magnets 111 against particles carried by the coolant fluid.

In accordance with at least some embodiments, the one or more through-openings 116 are positioned between the electromagnets 110 and the rotor shaft 104 in a radial direction of the rotor. The positioning of the through-openings provides that the electromagnets may be covered by a surface of the outer shell that extends in a direction that is parallel to the radial direction 115 of the rotor, while a coolant fluid may be passed through the outer shell.

In accordance with at least some embodiments, the one or more through-openings 116 are arranged annularly with respect to the rotor shaft 104. In this way a flow of coolant fluid may be supported to cooling channels that are arranged annularly with respect to the rotor shaft. Provided the cooling channels are also arranged annularly with respect to the rotor shaft 104 the annular arrangement of the through-openings 116 provides that the coolant fluid may enter the cooling channels 112 via the through-openings 116 the shortest way.

In accordance with at least some embodiments, the one or more through-openings 116 are rectangular openings, circular openings and/or openings that are arched with respect to the rotor shaft 104. The shapes of the openings may be selected to support guiding a coolant fluid to the cooling channels.

In accordance with at least some embodiments, the BLDC electric motor comprises sealing structures 118,120 between the stator hub 108 and the outer shell, and the electromagnets 110 are enclosed within a space 130 formed by the outer shell and the stator hub 108 and the sealing structures 118,120. In this way contamination of the electromagnets 110 and the permanent magnets 111 by particles carried by a fluid flow may be prevented.

In accordance with at least some embodiments, the sealing structures 118,120 comprise one or more shaft sealings, one or more non-contact-sealings, for example one or more labyrinth sealings, and/or one or more bearing assemblies. The sealing structures provide that a mechanical friction to a rotational movement of the stator hub and the outer shell is small or the mechanical friction may be prevented. It should be noted that the sealing structures of the BLDC electric motor may comprise different types of sealing structures, for example a non-contact sealing structure, for example a labyrinth seal, and a contact sealing structure, for example a shaft sealing or a bearing assembly.

In accordance with at least some embodiments, the sealing structures 118,120 comprise a first sealing structure 118 and a second sealing structure 120, and the first sealing structure 118 is arranged at first positions, at the stator hub 108 and at the outer shell, radially outwards from the cooling channels 112 and the second sealing structure 120 is arranged at second positions, at the stator hub 108 and at the outer shell, separated in the longitudinal direction 113 of the rotor shaft 104 and/or in a direction that is transverse to the longitudinal direction 113 of the rotor shaft 104 from the first positions. At least some positions of the sealing structures provide that at least one of the sealing structures may be positioned away radially away from the cooling channels, whereby exposure of the sealing structure to particles of the coolant fluid may be reduced. On the other hand at least some positions of the sealing structures provide that the outer shell may cover the electromagnets 110 on opposite sides in the longitudinal direction 113 of the rotor shaft.

In accordance with at least some embodiments, the outer shell comprises an annular part 122 arranged to extend in a direction that is parallel to the longitudinal direction 113 of the rotor shaft 104 for annularly covering at least a part of the stator and at least one of the second positions comprise a position at the annular part 122 of the outer shell. Sealing structure at the annular part provides that exposure of the sealing structure to particles of the coolant fluid may be reduced due to the location of the sealing structure being away from the cooling channels in a radial direction 115 of the rotor.

In accordance with at least some embodiments, the cooling channels 112 extend through the stator hub 108 in the longitudinal direction 113 of the rotor shaft 104. In this way the cooling channels do not need space from around the electromagnets and structure of the BLDC electric motor may be compact.

In accordance with at least some embodiments, wherein the cooling channels 112 have circular cross-sections, rectangular cross-sections and/or arched cross-sections. The cross-sections of the cooling channels provide efficient cooling depending on implementation of the BLDC electric motor.

In accordance with at least some embodiments, the cooling channels 112 are arranged annularly with respect to the rotor shaft 104. In this way efficient heat transfer from the electromagnets 110 into a coolant fluid flowing through the cooling channels may be supported.

In accordance with at least some embodiments, the stator hub 108 comprises mounting positions 124,126 for bearing assemblies and the cooling channels 112 extend between the mounting positions 124,126 and the electromagnets 110. In this way the position of the cooling channels support cooling of the bearing assemblies.

In accordance with at least some embodiments, the BLDC electric motor comprises a heat sink 128 arranged on a surface of the stator hub 108. The heat sink provides additional cooling, which may be needed depending on implementation of the BLDC electric motor.

In accordance with at least some embodiments, the BLDC electric motor comprises a fan arranged at one end of the cooling channels 112. The fan provides controlling movement of the coolant fluid through the cooling channels.

In an example, the outer shell 102 may serve as the fan or a separate fan may be connected to the rotor shaft 104. The one or more through-openings 116 of the outer shell 102 are inclined with respect to at least one of:

the direction that is parallel to a longitudinal direction 113 of the rotor shaft;

the direction that is parallel to a radial direction 115 of the rotor; and a direction of rotation of the rotor shaft 104.

In this way the through-openings 116 may be shaped for causing a fluid flow through the cooling channels 112, whereby the outer shell 102 may serve as a fan. The cross-sections of the through-openings may be rectangular openings, circular openings and/or openings that are arched with respect to the rotor shaft. In an example, an inclination of a through-opening 116 may be achieved by deflecting a position of one end of the through-opening at one side of the outer shell with respect to a position of an opposite end of the through-opening 116 at the opposite side of the outer shell. Accordingly, the opposite ends of the through-opening may be deflected with respect to each other in at least one of the longitudinal direction 113 of the rotor shaft, the radial direction 115 of the rotor and the direction of rotation of the rotor shaft. In an example, the deflection may be achieved by drilling the though-opening through the outer shell at an inclined angle with respect to at least one of the longitudinal direction 113 of the rotor shaft and the radial direction 115 of the rotor.

Figure 4:
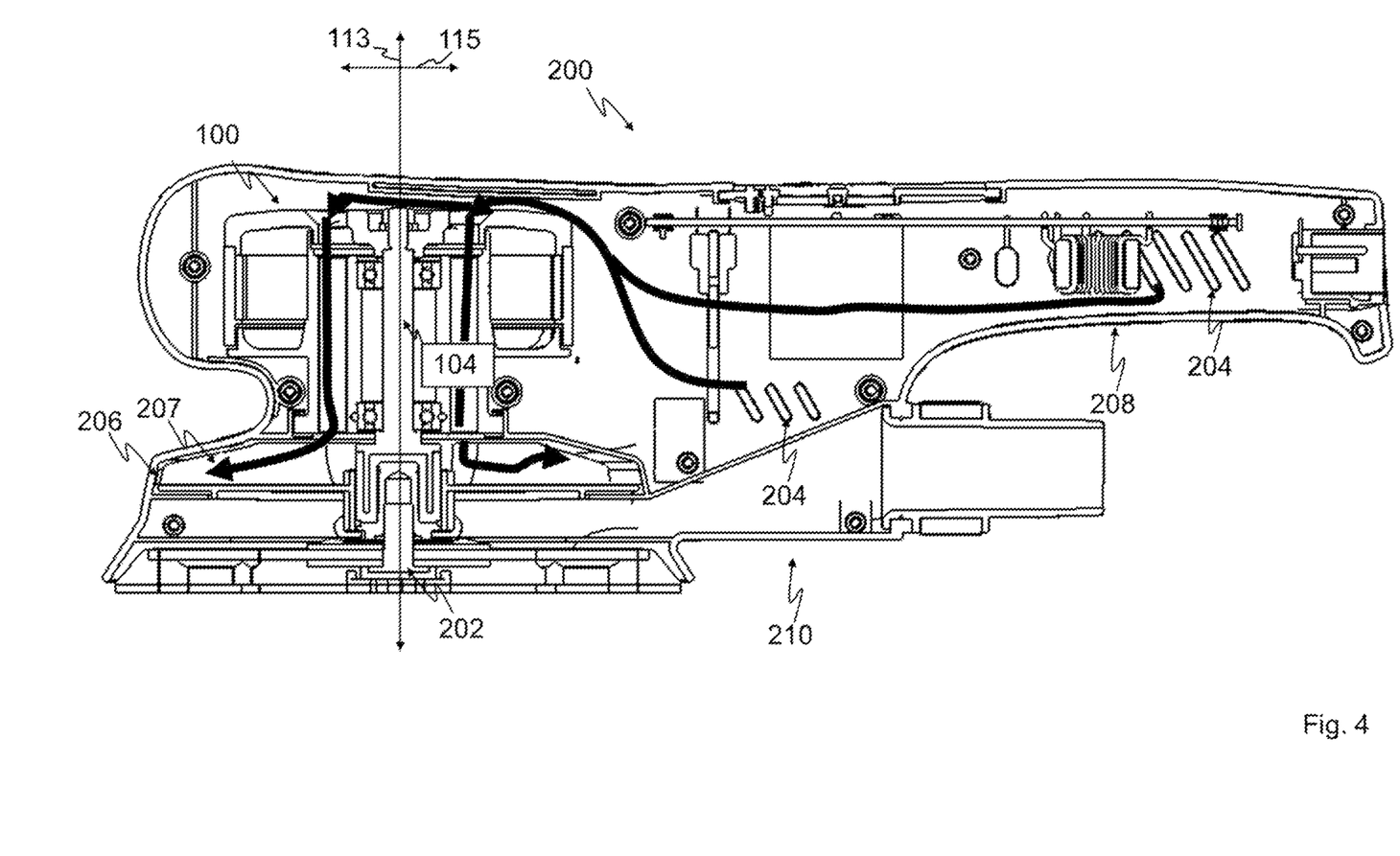
FIG. 4 illustrates a handheld tool in accordance with at least some embodiments.

FIG. 4 illustrates a handheld tool in accordance with at least some embodiments. The handheld tool 200 comprises a BLDC electric motor 100 in accordance with at least some of the embodiments described with FIG. 1, FIG. 2 and FIG. 3. In the following the handheld tool is described with reference to FIG. 4 and the items described with FIGS. 1 to 3. The handheld tool is illustrated by a cross-section of the handheld tool in a longitudinal direction 113 of a rotor shaft of the BLDG electric motor 100. Accordingly, the handheld tool and the BLDC electric motor therein may be powered by DC electricity. The DC may be obtained from controller that controls switching of DC current, e.g. from an inverter, to the electromagnets 110. The DC fed by the controller to each of the electromagnets may be Pulse Width Modulated (PWM) DC. In this way the controller may control the speed and torque of the rotor shaft 104. The controller may be implemented in software using a microcontroller or microprocessor computer, or may alternatively be implemented using analog or digital circuits.

The handheld tool 200 may comprise openings 204 arranged on a housing of the handheld tool for allowing an air flow to enter the housing for cooling the BLDC electric motor. The air flow may include particles such as dust and debris, and therefore the BLDG electric motor should be protected against the particles such that accumulation of the particles into the BLDC electric motor and overheating caused by the accumulated particles and eventual failures of the BLDC electric motor caused by excess heating could be prevented. In an example, the housing of the handheld tool 200 may comprise openings at one or more surfaces of the housing. The housing may comprise handle portion 208 that may be dimensioned for allowing the handle to be manually gripped by a single hand power grip. The housing may further comprise a body portion 210 that houses the BLDC electric motor. The openings may be provided at both the body portion and the handle portion. Both the handle portion and the body portion may comprise a surface at which one or more openings 204 may be provided for allowing an air flow to enter the housing. Having openings at both the handle portion and body portion support airflow in situations, where one of them is blocked, which may temporarily happen during use of the handheld tool.

The air flow is illustrated by thick arrows in FIG. 4. The air flow enters the housing via the openings 204. Inside the housing, the air flow is guided to the BLDC electric motor 100 and particularly to the through-openings at the outer shell 102. At the BLDC electric motor, the air flow may enter the cooling channels 112 and cool down the BLDC electric motor. The air flow that exits the cooling channels is exhaust air. The exhaust air may be guided to an exhaust outlet 206 for removing the exhaust air from the housing. In this way the air that has warmed up by the BLDC electric motor may be removed and fresh air may be drawn inside the handheld tool for cooling the BLDC motor. The BLDC electric motor may comprise a fan 207 for drawing fresh air into cooling channels and removing the used air out via the exhaust outlet.

In accordance with at least some embodiments, wherein the BLDC motor 100 is configured for driving tools and/or accessories of the handheld tool. Examples of the tools and accessories comprise at least a backing pad, polishing pad, sanding pad, a grinding disc, a drill bit, a screwdriver bit, a chisel and a circular saw blade. In an example, a rotor shaft 104 of the BLDC electric motor may comprise a thread for attaching tools and/or accessories to the rotor shaft 104.

In accordance with at least some embodiments, the handheld tool 200 is a polisher, a sander, a grinder, a screwdriver, an impact driver, a drill, a circular saw, chain saw or jack hammer.

Figure 5:
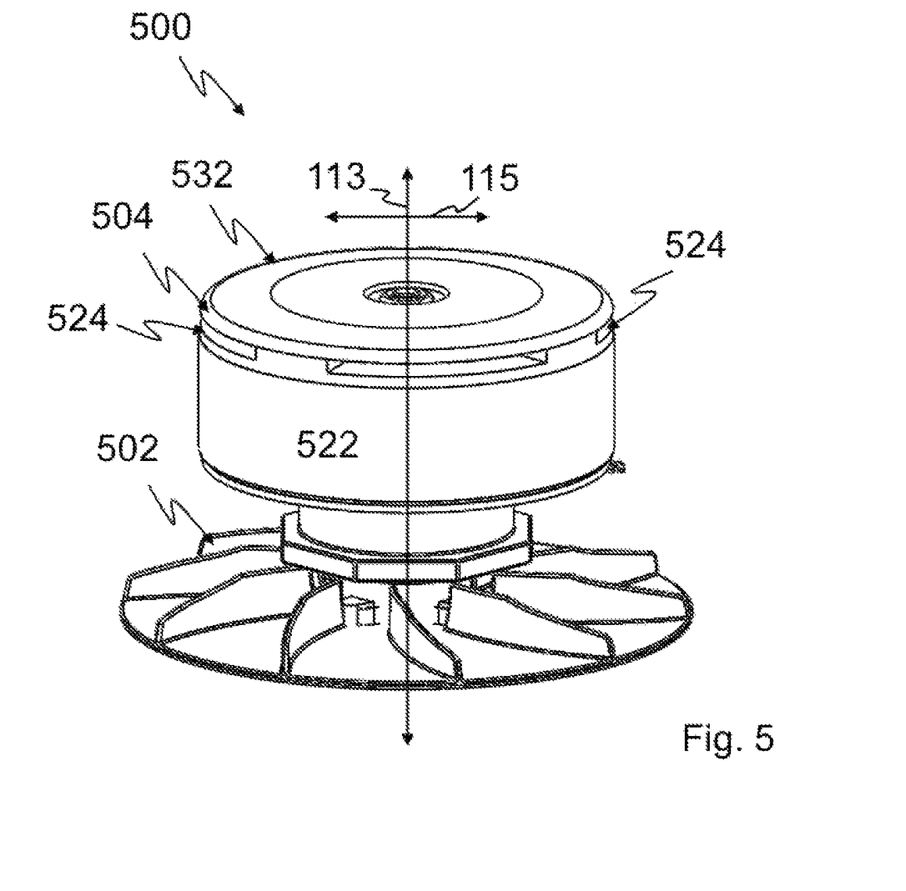
FIG. 5 is a perspective view of an electric motor in accordance with at least some embodiments.
Figure 6:
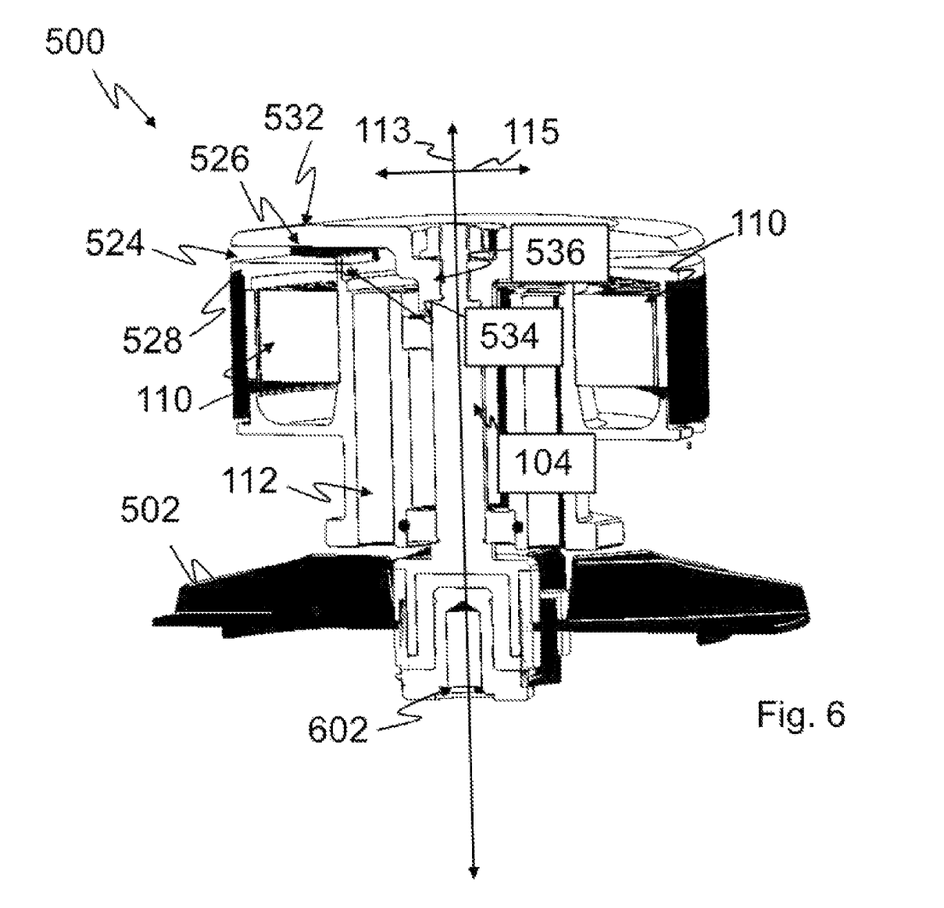
FIG. 6 is a cross-section of an electric motor in a longitudinal direction of a rotor shaft in accordance with at least some embodiments.

FIG. 5 and FIG. 6 illustrate examples for a passage of fluid between surroundings and cooling channels of an electric motor and a fan arranged to control a direction of the fluid via the cooling channels in accordance with at least some embodiments. FIG. 5 is a perspective view of the electric motor 500 and FIG. 6 is a cross-section of the electric motor in a longitudinal direction 113 of a rotor shaft 104 of the electric motor. The electric motor may be at least partly in accordance with the electric motor described with FIG. 1, FIG. 2 and FIG. 3. The electric motor 500 comprises a stator arranged around a rotor shaft 104, an outer shell connected to the rotor shaft 104 and cooling channels 112 positioned between the rotor shaft 104 and electromagnets 110 of the stator.

A passage for fluid may be provided by one or more through-openings 524 arranged to the outer shell in a radial direction 115 of the rotor. In this way a flow of fluid in the radial direction 115 through the outer shell may be provided. More particularly, the through-openings may serve for passages of fluid into the cooling channels 112 inside the outer shell and/or for passages of fluid from the cooling channels 112 out of the outer shell.

In an example, a through-opening 524 may comprise orifices on opposite sides of the outer shell and connected by a passage through the outer shell. One of the orifices may be provided on an outer surface of the outer shell arranged to extend in a direction that is parallel to the longitudinal direction 113 of the rotor shaft, and one of the orifices may be provided on an inner surface of the outer shell, whereby the passage of the through-opening may provide a flow of fluid in the radial direction 115 through the outer shell.

In an example, the passage of the through-opening 524 may be a radial passage inside the outer shell. The radial passage may extend between a stator hub 108 of the stator and a top surface 532 of the outer shell and between a surface of the annular part 522 and the cooling channels 112. The radial passage may have a top wall 526 and a bottom wall 528 that are separated in the longitudinal direction 113 of the rotor shaft. The top wall may be formed by the top surface 532 of the outer shell and the bottom wall may be formed by a radial surface of the outer shell, located below the top surface in the longitudinal direction of the rotor shaft and separated by a distance from the top surface in the longitudinal direction 113 of the rotor shaft. The bottom wall is configured to separate the electromagnets 110 from the fluid flowing inside the radial passage. The top wall may extend in one or more sections between the surface of the annular part 522 and the rotor shaft 104. The bottom wall may extend in one or more sections between the surface of the annular part 522 and the stator hub.

Orifices of the one or more through-openings may comprise annular structures 534, 536 for connecting the radial passages to the stator hub and the rotor shaft. The annular structures 534, 536 may be annular to the rotor shaft and the annular structure 536 may be closer to the rotor shaft in the radial direction 115 than the annular structure 534. In this way the cooling channels may be positioned between the annular structures 534, 536 in the radial direction of the rotor. A sealing structure 118 may connect the annular structure 534 to the stator hub. A connection between the annular structure and the rotor shaft may be an interference fit.

A fan 502 may be arranged at one end of the cooling channels 112 for controlling a direction of fluid flow via the cooling channels. The fan 502 may be located at a bottom end of the cooling channels, below the stator hub 108, in the longitudinal direction 113 of the rotor shaft. The fan may be configured to be rotated by the rotor shaft 104 for producing a pressure difference over the fan in the longitudinal direction 113 of the rotor shaft, and hence force, the fluid flow through the fan and into the cooling channels or out of the cooling channels.

In an example, the fan 502 may be connected to the rotor shaft 104 or an output shaft driven by the rotor shaft, whereby the fan may be rotated directly or indirectly by the rotor shaft.

Figure 7:
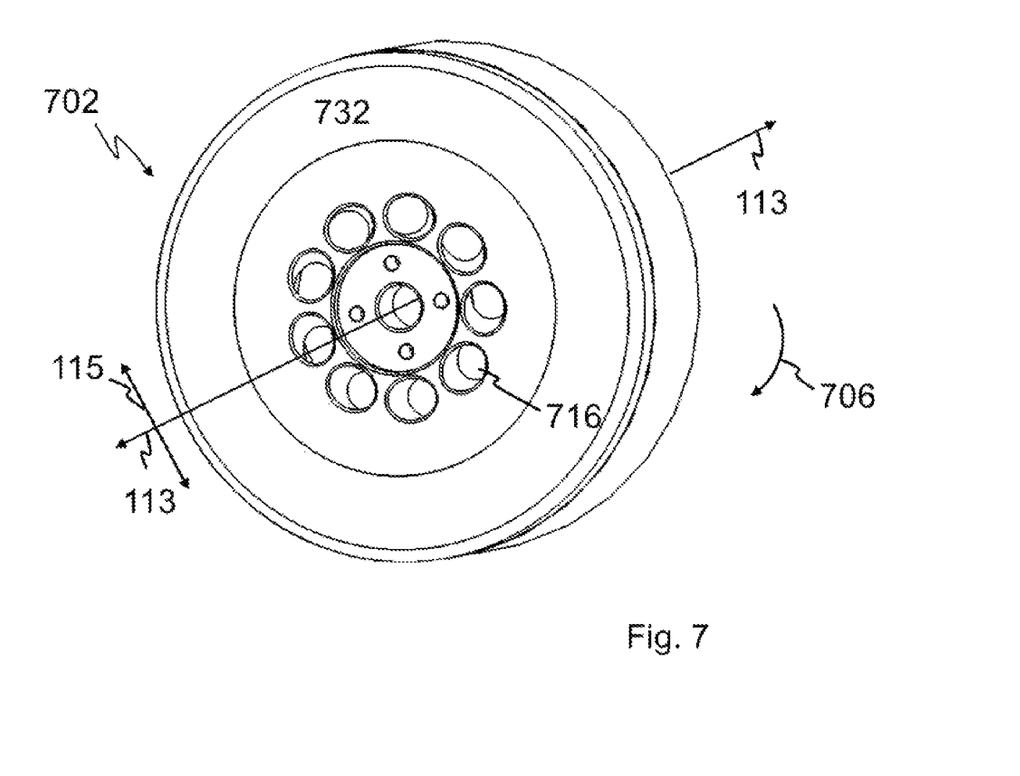
FIG. 7 and FIG. 8 illustrate an outer shell suitable for serving as a fan in accordance with at least some embodiments.
Figure 8:
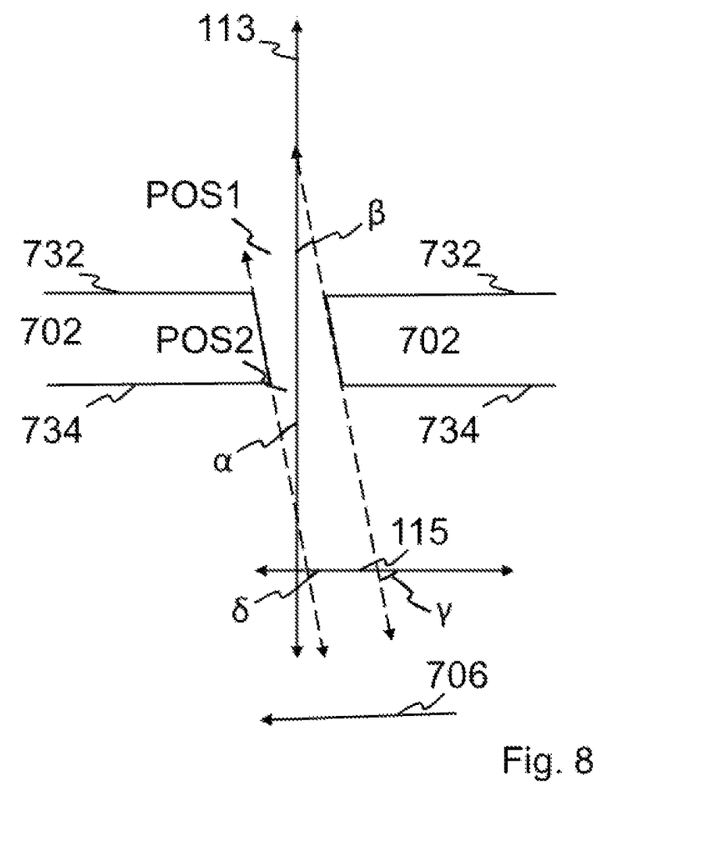

FIG. 7 and FIG. 8 illustrate an outer shell suitable for serving as a fan in accordance with at least some embodiments. FIG. 7 is a perspective view of the outer shell and FIG. 8 is a cross-section of a part of the outer shell. The outer shell 702 may be used in a BLDC electric motor described at least in some embodiments described herein. In the following the outer shell is described with reference to at least some of the items described with FIG. 1.

The outer shell comprises a surface 732, e.g. a top surface or outer surface, that may be connected to a rotor shaft 104. When connected to the rotor shaft 104, the surface 732 may extend at least in the radial direction 115 of the rotor on one side of the electromagnets 110. The outer shell comprises through-openings 716 that are inclined with respect to at least one of;
    the direction that is parallel to a longitudinal direction 113 of the rotor shaft;
    the direction that is parallel to a radial direction 115 of the rotor; and
    a direction 706 of rotation of the rotor shaft 104. In this way the through-openings 716 may be shaped for causing a fluid flow through the cooling channels 112, whereby the outer shell 102 may serve as a fan.

In an example, the inclination of the through-openings 716 causes that positions of opposite ends of the through openings are deflected with respect to each other in the radial direction 115 and/or the longitudinal direction 113. In an example, an inclination of a through-opening 716 may be achieved by deflecting a position of one end of the through-opening at one side of the outer shell, e.g. at the outer surface 732, with respect to a position of an opposite end of the through-opening 716 at the opposite side of the outer shell, e.g. at an inner surface 734 of the outer shell. Accordingly, the through-opening may comprise an orifice at one end at a position "POS1" on the outer surface 732 and the through-opening may comprise another orifice at the other end at a position "POS2" on the inner surface 734 that is on the opposite side of the of the outer shell than the outer surface 732. Examples of the inclination are illustrated by angles α, β, δ and γ at different sides of the through-opening in the direction 706 of rotation of the rotor shaft. The angles α and β are angles with respect to the longitudinal direction 113 and the angles δ and γ are angles with respect to the radial direction 115. It should be noted that the inclination of the through-opening may be defined further with respect to the direction 706 of rotation of the rotor shaft. In an example, angles α and β of the through-opening with respect to the longitudinal direction may be different at different sides of the through-opening in the direction 706 of rotation. Similarly, angles δ and γ of the through-opening with respect to the radial direction may be different at different sides of the through-opening in the direction 706 of rotation.

It should be note that in the foregoing any direction in a radial direction may be a direction that is parallel to the radial direction and or any direction in a longitudinal direction may be a direction that is parallel to the longitudinal direction. A direction that is parallel with the radial direction or the longitudinal direction may be determined on the basis of a comparison of the direction with the radial direction or the longitudinal direction. In an example, the direction may be evaluated to determine whether the direction is parallel with the radial direction or the longitudinal direction. The direction may be divided into components of a coordinate system, such as a cartesian coordinate system spanned in X, Y and Z-dimension, whereby one of the X, Y and Z-dimensions may be aligned with the radial direction or the longitudinal direction. Then a length of the components of the evaluated direction may be compared with each other and if the component with the highest value is in the direction of the dimension that is aligned with the radial direction or the longitudinal direction, the direction may be determined to be parallel with the radial direction or the longitudinal direction. In a simple example, if an evaluated direction has only a component in the X-direction, that is aligned with the radial direction, the evaluated direction may be determined to be parallel with the radial direction. In another example, if an evaluated direction has X, V and Z-components such that the X-component has the highest value, X>Y>Z, then if the X-direction is aligned with the radial direction, the evaluated direction may be determined to be parallel with the radial direction.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A brushless direct current, BLDC, electric motor comprising:
   a. a rotor comprising a rotor shaft,
   b. a stator arranged around the rotor shaft, wherein the stator comprises a stator hub comprising electromagnets, wherein
   c. the stator hub comprises cooling channels extending in a direction that is parallel to a longitudinal direction of the rotor shaft and the cooling channels are positioned between the rotor shaft and the electromagnets,
      wherein the rotor comprises an outer shell connected to the rotor shaft and the outer shell is configured to extend in a direction that is parallel to a radial direction of the rotor on one side of the electromagnets for covering the electromagnets, and the outer shell comprises one or more through-openings for passage of fluid between surroundings of the BLDC electric motor and the cooling channels, wherein the BLDC electric motor comprises sealing structures between the stator hub and the outer shell, and the electromagnets are enclosed within a space formed by the outer shell and the stator hub and the sealing structures.

2. The BLDC electric motor according to claim 1, wherein the outer shell is at least partly made of Aluminum.

3. The BLDC electric motor according to claim 1, wherein the one or more through-openings are inclined with respect to at least one of:
   the direction that is parallel to a longitudinal direction of the rotor shaft;
   the direction that is parallel to a radial direction of the rotor; and
   a direction of rotation of the rotor shaft.

4. The BLDC electric motor according to claim 1, wherein the one or more through-openings are positioned between the electromagnets and the rotor shaft in the radial direction of the rotor.

5. The BLDC electric motor according to claim 1, wherein the one or more through-openings are arranged annularly with respect to the rotor shaft.

6. The BLDC electric motor according to claim 1, wherein the one or more through-openings are arranged to the outer shell in the radial direction of the rotor shaft.

7. The BLDC electric motor according to claim 1, wherein the sealing structures comprise one or more shaft sealings, one or more non-contact-sealings, for example one or more labyrinth sealings, and/or one or more bearing assemblies.

8. The BLDC electric motor according to claim 1, wherein the sealing structures comprise a first sealing structure and a second sealing structure, and the first sealing structure is arranged at first positions, at the stator hub and at the outer shell, radially outwards from the cooling channels and the second sealing structure is arranged at second positions, at the stator hub and at the outer shell, separated in the longitudinal direction of the rotor shaft and/or in a direction that is transverse to the longitudinal direction of the rotor shaft from the first positions.

9. The BLDC electric motor according to claim 8, wherein the outer shell comprises an annular part arranged to extend in a direction that is parallel to the longitudinal direction of the rotor shaft for annularly covering at least a part of the stator and at least one of the second positions comprise a position at the annular part of the outer shell.

10. The BLDC electric motor according to claim 1, wherein the cooling channels are arranged annularly with respect to the rotor shaft.

11. The BLDC electric motor according to claim 1, wherein the stator hub comprises mounting positions for bearing assemblies and the cooling channels extend between the mounting positions and the electromagnets.

12. The BLDC electric motor according to claim 1, comprising a heat sink arranged on a surface of the stator hub.

13. The BLDC electric motor according to claim 1, comprising: a fan arranged at one end of the cooling channels.

14. The BLDC electric motor according to claim 1, wherein the stator hub is made of Aluminum.

15. A handheld tool comprising a brushless direct current, BLDC, electric motor comprising:
   a. a rotor comprising a rotor shaft,
   b. a stator arranged around the rotor shaft, wherein the stator comprises a stator hub comprising electromagnets, wherein
   c. the stator hub comprises cooling channels extending in a direction that is parallel to a longitudinal direction of the rotor shaft and the cooling channels are positioned between the rotor shaft and the electromagnets,
      wherein the rotor comprises an outer shell connected to the rotor shaft and the outer shell is configured to extend in a direction that is parallel to a radial direction of the rotor on one side of the electromagnets for covering the electromagnets, and the outer shell comprises one or more through-openings for passage of fluid between surroundings of the BLDC electric motor and the cooling channels, wherein the BLDC electric motor comprises sealing structures between the stator hub and the outer shell, and the electromagnets are enclosed within a space formed by the outer shell and the stator hub and the sealing structures.

16. The handheld tool according to claim 15, wherein the BLDC motor is configured for driving tools and/or accessories of the handheld tool.

17. The handheld tool according to claim 15, wherein the handheld tool is a polisher, a sander, a grinder, a screwdriver, an impact driver, a drill, a circular saw, chain saw or jack hammer.

\* \* \* \* \*